US009417694B2

(12) United States Patent
Birnbaum et al.

(10) Patent No.: US 9,417,694 B2
(45) Date of Patent: Aug. 16, 2016

(54) SYSTEM AND METHOD FOR HAPTIC DISPLAY OF DATA TRANSFERS

(75) Inventors: David M. Birnbaum, Oakland, CA (US); Christopher J. Ullrich, Ventura, CA (US)

(73) Assignee: Immersion Corporation, San Jose, CA (US)

( * ) Notice: Subject to any disclaimer, the term of this patent is extended or adjusted under 35 U.S.C. 154(b) by 253 days.

(21) Appl. No.: 12/609,100

(22) Filed: Oct. 30, 2009

(65) Prior Publication Data

US 2011/0102332 A1 May 5, 2011

(51) Int. Cl.
*G06F 3/01* (2006.01)
*G06F 3/0488* (2013.01)

(52) U.S. Cl.
CPC .............. *G06F 3/016* (2013.01); *G06F 3/014* (2013.01); *G06F 3/017* (2013.01); *G06F 3/04883* (2013.01)

(58) Field of Classification Search
CPC ....... G06F 3/016; G06F 3/0488; G06F 3/017; G06F 13/14; G06F 2203/014; G06F 1/163; G06F 2203/015
USPC ............................................ 463/37; 345/156
See application file for complete search history.

(56) References Cited

U.S. PATENT DOCUMENTS

| | | | |
|---|---|---|---|
| 4,731,815 A * | 3/1988 | Hanscom et al. | 379/79 |
| 5,361,241 A | 11/1994 | Ferrara et al. | |
| 6,259,935 B1 * | 7/2001 | Saiki et al. | 455/567 |
| 6,359,550 B1 | 3/2002 | Brisebois et al. | |
| 6,363,324 B1 * | 3/2002 | Hildebrant | 701/468 |
| 2002/0019586 A1 * | 2/2002 | Teller et al. | 600/300 |

(Continued)

FOREIGN PATENT DOCUMENTS

| | | |
|---|---|---|
| CN | 101421686 A | 4/2009 |
| EP | 2 138 927 A1 | 12/2009 |

(Continued)

OTHER PUBLICATIONS

NPL at url http://www.codeproject.com/Articles/36647/How-to-copy-files-in-C-with-a-customizable-progres, attached here as pdf file named Cadman_url.pdf.*

(Continued)

*Primary Examiner* — Grant Sitta
(74) *Attorney, Agent, or Firm* — Medler Ferro Woodhouse & Mills

(57) ABSTRACT

A method is disclosed for transferring digital information from a first electronic device to a second electronic device. In one example, the first device is a computer having a touch screen and the second device is a personal memory device carried or worn by an individual. The method includes selecting information on the first electronic device to be transferred, which can be done by touching the touch screen and performing a predefined finger gesture on the screen. Next, communication is established between the first electronic device and the second electronic device, preferably through a wireless connection such as Bluetooth. The selected information from the first electronic device then begins to upload to the second electronic device. As the information is transferred, vibrotactile sensations are imparted to the body of an individual with the vibrotactile sensations being indicative of the upload of information. For instance, sensations might be sequentially imparted in a line along an individual's arm to convey the progress of information upload to the individual.

21 Claims, 5 Drawing Sheets

(56) References Cited

U.S. PATENT DOCUMENTS

| | | | |
|---|---|---|---|
| 2002/0115469 A1 | 8/2002 | Rekimoto et al. | |
| 2003/0146977 A1* | 8/2003 | Vale et al. | 348/207.1 |
| 2004/0048570 A1 | 3/2004 | Oba et al. | |
| 2004/0204147 A1* | 10/2004 | Nielsen | 455/567 |
| 2005/0060492 A1* | 3/2005 | Rao | 711/115 |
| 2005/0237704 A1 | 10/2005 | Ceresoli | |
| 2007/0139167 A1 | 6/2007 | Gilson et al. | |
| 2008/0039152 A1* | 2/2008 | Arisawa | 455/567 |
| 2008/0256471 A1 | 10/2008 | Okamoto | |
| 2009/0017799 A1 | 1/2009 | Thorn | |
| 2009/0062092 A1* | 3/2009 | Mortimer et al. | 482/142 |
| 2009/0270045 A1* | 10/2009 | Flaherty | 455/73 |
| 2009/0322498 A1* | 12/2009 | Yun et al. | 340/407.2 |

FOREIGN PATENT DOCUMENTS

| | | |
|---|---|---|
| JP | H11-046230 A | 2/1999 |
| JP | 2002-135378 A | 5/2002 |
| JP | 2004-030284 A | 1/2004 |
| JP | 2004-260306 A | 9/2004 |
| JP | 2005-099064 A | 4/2005 |
| JP | 2008-257442 A | 10/2008 |
| JP | 2010-511959 | 4/2010 |
| WO | WO 2005/103862 | 11/2005 |
| WO | WO 2007/034457 | 3/2007 |
| WO | WO 2008/025058 A1 | 3/2008 |
| WO | WO 2008/069570 A1 | 6/2008 |

OTHER PUBLICATIONS

NPL at url http://www.psdgraphics.com/psd-icons/psd-download-and-upload-icons/, attached here as pdf file named PSD_url.pdf.*
Robert W. Lindeman et al, "The Design and Deployment of a Wearable Vibrotactile Feedback System" *Eighth IEEE International Symposium on Wearable Computers (ISWC'04)*, Arlington, VA, Oct. 31-Nov. 03, 2004, pp. 56-59.
Int'l Search Report dated Mar. 2, 2011 issued in corresponding Int'l Appln. No. PCT/US2010/052991.
Extended European Search Report as issued in European Patent Application No. 14196323.1, dated Feb. 18, 2015.
Notification of Reason for Refusal as issued in Japanese Patent Application No. 2012-536869, dated May 28, 2015.
Notification of Reason for Refusal as issued in Japanese Patent Application No. 2012-536869, dated Aug. 12, 2014.
Notification of the First Office Action as issued in Chinese Patent Application No. 201080046995.5, dated Jun. 5, 2014.
Notification of the Second Office Action as issued in Chinese Patent Application No. 201080046995.5, dated Feb. 4, 2015.
Communication Pursuant to Rules 161(1) and 162 EPC and the Written Opinion of the International Searching Authority as issued in European Patent Application No. 10775969.8, dated Jun. 6, 2012.
Communication Pursuant to Article 94(3) EPC as issued in European Patent Application No. 10775969.8, dated Mar. 7, 2013.
Summons to Attend Oral Proceedings Pursuant to Rule 115(1) EPC as issued in European Patent Application No. 10775969.8, dated Feb. 24, 2014.

* cited by examiner

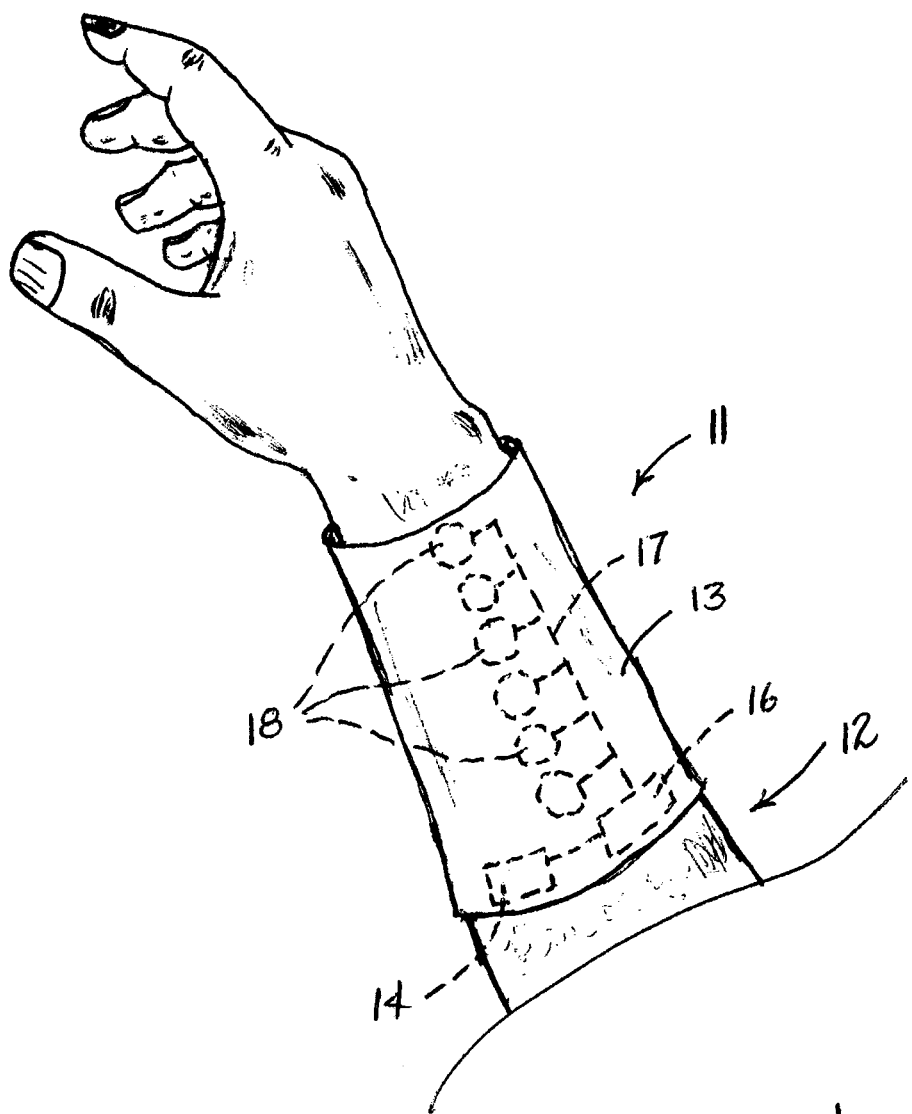

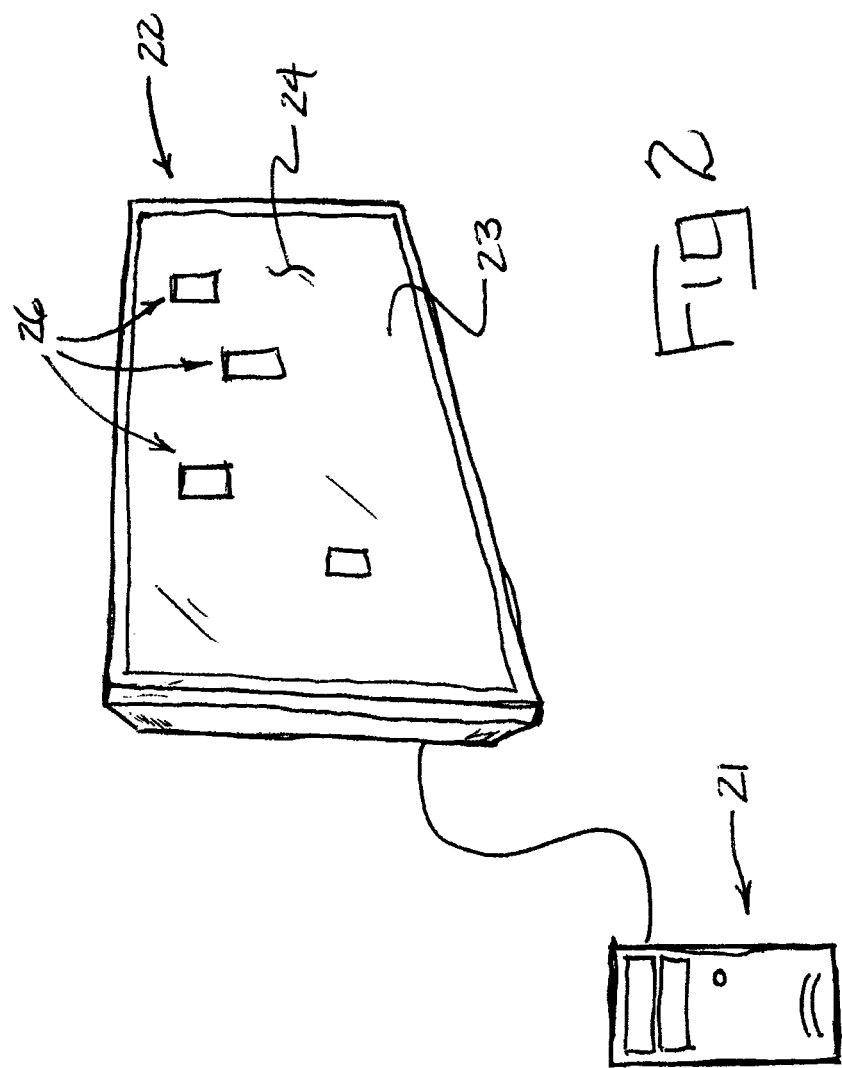

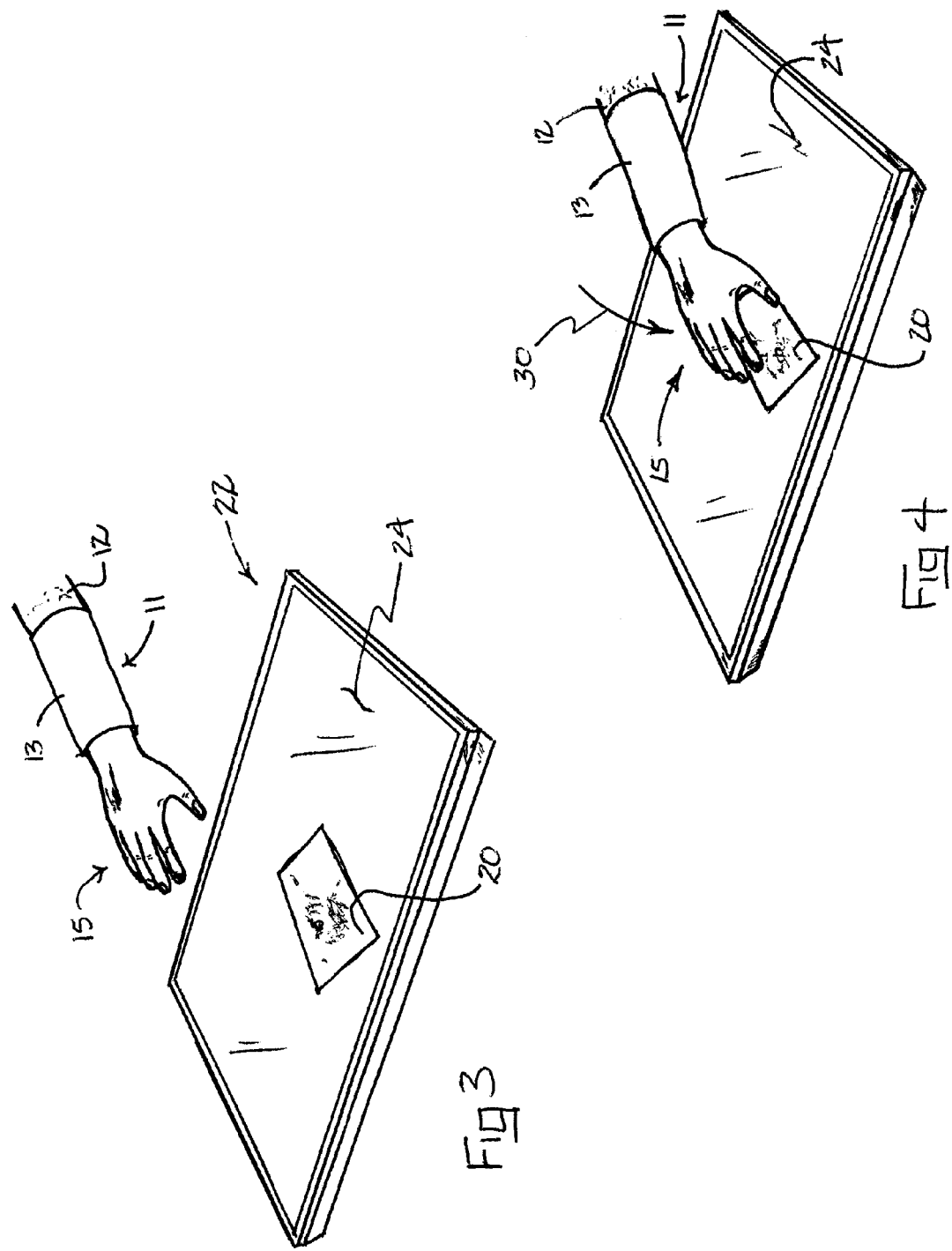

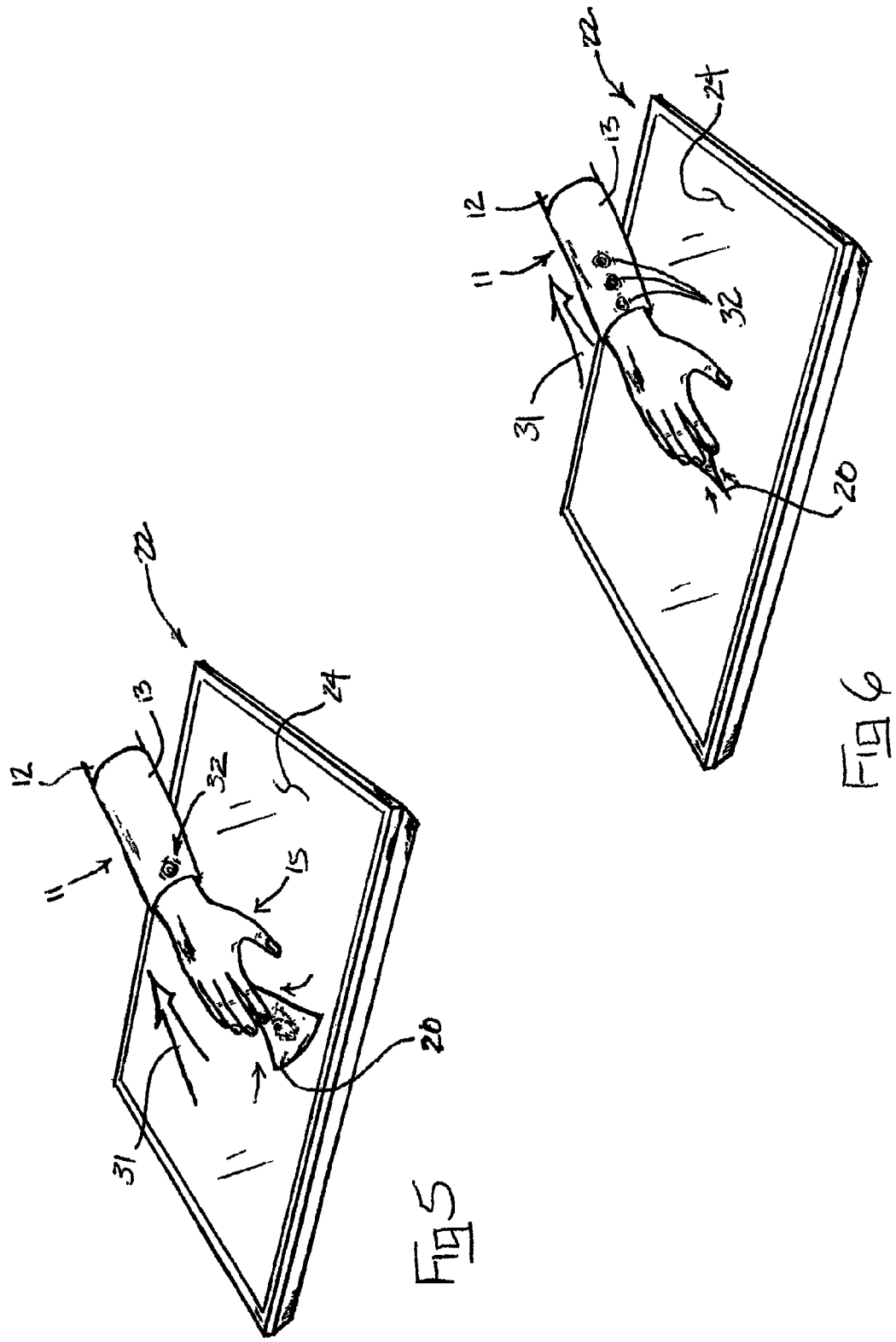

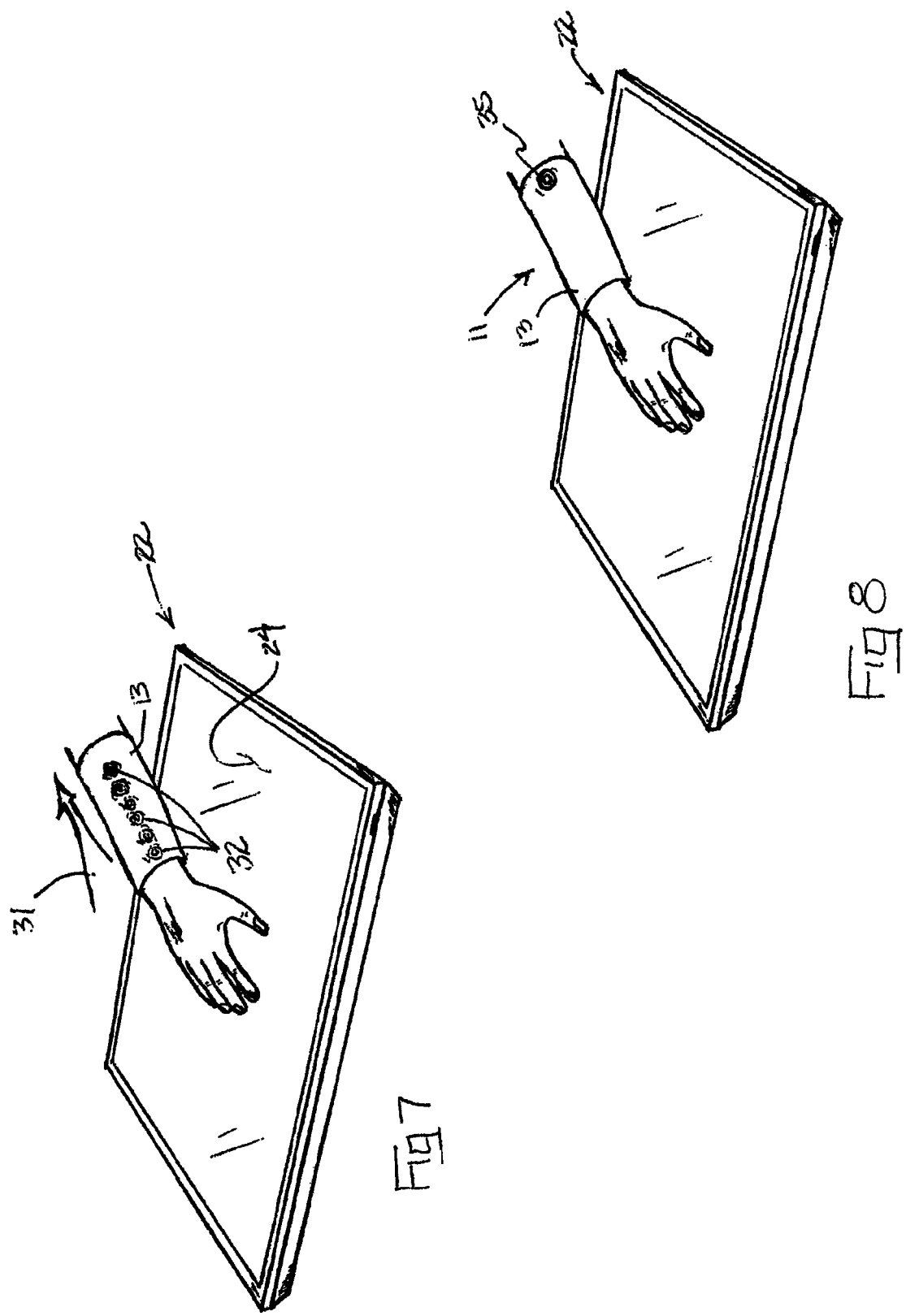

SYSTEM AND METHOD FOR HAPTIC DISPLAY OF DATA TRANSFERS

TECHNICAL FIELD

This disclosure relates generally to human interaction with touch screens and more particularly to the exchange of data between a computer coupled to a touch screen and a portable device worn by a user, with the exchange being accompanied by corresponding haptic effects.

BACKGROUND

New generation consumer and commercial devices increasingly rely on touch screen inputs and displays as the preferred method of exchanging information between a computer and a user. For example, virtual buttons, sliders, and the like may be displayed on the display of a touch screen, and a user may indicate preferences or select among options by "pressing" or otherwise manipulating these virtual inputs. It is expected that interaction between users and a wide variety of everyday devices using touch screens will become more and more prevalent until it is merely a part of everyday life. It also is becoming common for individuals to carry with them personal portable data storage devices such as USB flash drives, portable hard drives, memory cards, and the like. These devices are used by people to store a wide variety of useful data and information such as, for instance, financial records, official documents, medical records, photographs and videos, and music files. It also is expected that this trend will continue until portable storage devices are just as commonly worn by individuals as wristwatches and jewelry.

As the above trends continue to grow, improved and simpler techniques for transferring data and information between computers and other devices and the portable storage devices of individuals will immerge. Presently, this type of transaction may involve placement of an individual's USB flash drive into a USB port of a computer. Recognition of the presence of the drive is displayed as an icon representing the drive in the graphical user interface (GUI) of the computer. A user may then drag files, folders, photographs, music files, and the like onto the displayed icon to copy or move them to the inserted USB flash drive. This can be done using a mouse or it may be accomplished by moving fingertips across a touch screen. For each item dragged to the icon, a progress bar appears, and when the bar has progressed from left to right, the data transfer is complete. The user may then remove the USB flash drive from the USB port and carry it away with the transferred data stored thereon.

While the above process for transferring information to a personal storage device is functional, it nevertheless is cumbersome, complicated, and requires at least a moderate degree of computer skills to accomplish. There is thus a present and growing need in view of the above trends for a simpler, more intuitive, and more interactive method of transferring information and data between a computer or other device having a display and the personal portable storage device of an individual. There is a related need for a continuous notification to individuals that files are contained on their personal portable storage devices. It is to the provision of such methods that the present disclosure is primarily directed.

SUMMARY

A method and apparatus is disclosed for transferring data between a computer or other device having a touch screen and the personal portable storage device of an individual. The method involves the use of a Bluetooth or other wireless personal data storage device worn by an individual in combination with a special vibrotactile forearm display. The vibrotactile forearm display may take the form of a forearm band having a spaced array of vibrotactile actuators positioned to apply vibratory or haptic effects to the forearm of a user in predetermined patterns or sequences. The actuators are controlled by a controller, which also is coupled to the worn personal storage device. The computer is programmed to respond to touches and gestures applied to its surface by a user.

In one possible example, an individual wearing the personal storage device and forearm display may approach a touch screen that displays, for instance, a photograph that the user wishes to load into the personal storage device. Of course, the photograph in this example may be replaced by an icon representing virtually any type of information such as music files, documents, and the like. In the present example, however, the individual may simply touch the screen near the photograph and perform a finger gesture that is interpreted by the computer to indicate a request to upload the photograph to the individual's wireless storage device. The photograph on the screen may then move under the individual's hand, shrink, and disappear indicating that it is being delivered to the individual's personal storage device. Immediately thereafter, a haptic actuator of the vibrotactile forearm display near the individual's hand is activated, imparting a vibration indicating the start of data delivery. As more of the photograph is uploaded, haptic actuators higher and higher up the individuals forearm are actuated to indicate the progress of data transfer. The individual thus feels the file moving up his or her arm. At the end of the transfer, a different haptic effect may be imparted to the individual's forearm to indicate that the upload of the photograph is complete. Thereafter, the individual may receive a continuous or periodic haptic effect through the forearm display to indicate that the uploaded file is still present.

Thus, a method and apparatus is disclosed that renders the exchange of data and information with computers and other devices significantly more simple, intuitive, and useable. The method also includes haptic messages indicating the presence of an uploaded file and perhaps other status information from a personal storage device. These and other aspects, features, and advantages will be better understood upon review of the detailed description set forth below, taken in conjunction with the accompanying drawing figures, which are briefly described as follows.

BRIEF DESCRIPTION OF THE DRAWINGS

FIG. 1 illustrates a forearm vibrotactile display and personal storage device according to the disclosure.

FIG. 2 illustrates a touch screen video display coupled to a computer according to the disclosure.

FIG. 3 illustrates an individual equipped with a wireless personal storage device and forearm vibrotactile display reaching for an image on a touch screen that the individual wishes to upload.

FIG. 4 illustrates the individual touching the touch screen in the vicinity of the image to select the image and performing a finger gesture to request an upload.

FIG. 5 illustrates the image shrinking beneath the individuals hand as the data transfer begins and the corresponding activation of a first actuator of the vibrotactile forearm display to indicate haptically the beginning of data transfer.

FIG. 6 illustrates continued data transfer and sequential activation of additional actuators of the vibrotactile forearm display to indicate haptically the progress of data transfer.

FIG. 7 illustrates data transfer near completion and the corresponding activation of actuators of the vibrotactile forearm display.

FIG. 8 illustrates the completion of data transfer and the application of a corresponding haptic effect through the forearm vibrotactile display to indicate to the wearer that the transfer of the photograph to his or her personal storage device is complete.

DETAILED DESCRIPTION

Referring now in more detail to the drawing figures, wherein like reference numerals indicate like parts throughout the several views, FIG. 1 shows a forearm vibrotactile display that embodies principles of the invention. The vibrotactile display 11 in this embodiment comprises a band or sleeve 13 that wraps around and is worn on the forearm 12 of an individual. A wireless personal memory device 14 such as, for example, a Bluetooth enabled flash memory chip, is located in the sleeve and is capable of exchanging data with a computer wirelessly. An actuator controller 16 is disposed in the sleeve 13 and is operatively coupled to the memory device 14 to monitor the status of data uploads to or downloads from the memory device. An array of vibrotactile actuators 18 are disposed in the sleeve 13 and are positioned such that, when activated, each actuator is capable of imparting a vibrational haptic sensation to the forearm 12 of the individual. In the illustrated embodiment, the actuators 18 arranged in a line extending up the forearm 12; however, this is not a limitation of the invention and the actuators may be arranged in any pattern or array desirable to suit a particular application. Regardless of the configuration of the array of actuators, each actuator 18 is operably connected to the actuator controller 16. The actuator controller is programmed to activate the actuators individually, sequentially, in groups, or otherwise as desired. Further, the actuator controller is capable of imparting different vibrational haptic effects to one or all of the actuators with the different effects being distinguishable by the individual. For example, the controller may apply haptic sensations to the actuators in short bursts, long bursts, sequences of bursts, or haptic sensations with unique vibrational profiles to impart various messages or information to the individual.

FIG. 2 illustrates, in generic form, a touch screen 22 having a display 24 that is touch enabled. The touch screen is coupled to and controlled by a computer 21, which, in this embodiment, is represented in generic form. However, the computer may be a stand alone computer as illustrated, or it may be a computer or controller embedded in a device such as, for instance, a kiosk, ATM machine, video game, cell phone, personal digital assistant (PDA), or other electronic device. The computer 21 is programmed to display images on the touch screen 22 such as, for instance, graphic elements 26 arranged on a background or field 23. The graphic elements 26 will be discussed herein as being photographs; however, it will be understood that they may be virtually any type of graphic element such as, for instance, icons indicative of, or displays of, files, folders, documents, spreadsheets, music, emails, voice mails, or any other type of information routinely displayed on a computer screen. The touch screen 22 also includes a touch sensitive panel overlying the display 24, which may be a capacitive touch panel, a resistive touch panel, or any other appropriate type of touch panel. The touch sensitive panel senses static and moving or dynamic touches of the screen by an individual and transmits to the computer 21 information indicative of the location of the touch on the screen as well as information about dynamic movements of a touch on the screen. In this way, an individual interacts through touch and finger gestures with the images and information presented on the screen and the computer is programmed to interpret the touches and gestures as request, commands, directions, and the like.

In general, the details of touch screen technology, vibrotactile actuators and controllers, and wireless data transfer are known to those of skill in the art and thus need not be described in detail here. However, the present invention, which makes use of these technologies, will now be described in greater detail with reference to FIGS. 3 through 8. These figures illustrate sequentially the method of this disclosure in one preferred embodiment. In particular, the methodology of the invention will be discussed within the context of an individual interacting with a touch screen to upload an image on the screen into a wireless personal storage device worn by the individual. It should be understood, however, that the invention is not limited to or by the particular embodiment selected as an example of the invention.

FIG. 3 illustrates a touch screen video display 22 displaying a field or background 24 upon which is displayed an image, which, in this example, is an image of a photograph 20. An individual's arm is seen reaching toward the screen. A vibrotactile display 11 configured as discussed above is fitted on the forearm 12 of the individual. In this example, the individual has identified the photograph 20 as an item he or she wants to upload from the computer screen to his or her wireless personal storage device. In FIG. 4, the individual moves his or her hand 15 as indicated at 30, to touch the touch screen display 22 on or in the vicinity of the photograph 20. The computer coupled to the screen is programmed to interpret this touch as a selection or identification of the photograph 20 by the individual.

In order to instruct the computer what the individual wishes done with the selected photograph, a finger gesture such as, for example, a grasping motion of the fingers, is carried out on the surface of the touch screen. The computer is programmed to interpret the gesture as an instruction to upload the data embodying the photograph to the wireless personal storage device of the individual. The computer then establishes communication with the individual's wireless personal storage device and initiates the data upload. In FIG. 5, upload of the data corresponding to the photograph 20 has begun as indicated at 31. Concurrently with the beginning of the upload, the vibrotactile controller of the vibrotactile display 11 activates the vibrotactile actuator nearest the individual's hand, as indicated at 32. This provides the individual with vibratory haptic feedback confirming the beginning of the transfer of the photograph 20 to his or her personal storage device. At the same time, a visual cue such as, for instance, manipulation of the photograph so that it appears to be "sucked" into the individual's hand, may be displayed on the touch screen display 22 as indicated in FIG. 5.

In FIG. 6, the upload of data embodying the photograph 20 proceeds. At the same time, the vibrotactile controller, which monitors the upload progress, sequentially activates the vibrotactile actuators as indicated at 32. In this way, the vibratory haptic sensation progressively moves up the individual's forearm indicating the progress of the upload. In a sense, the individual feels the file moving up his or her forearm as the data is transferred. In FIG. 7, the upload is near completion, and all of the vibrotactile actuators have been activated, each in sequence, as an indication to the individual that the upload of the selected photograph to his or her personal storage device is almost complete. Finally, in FIG. 8, the upload of data embodying the selected photograph is complete and the photograph has disappeared from the screen 22. At this point, the vibrotactile controller may signal completion by activating one or more of the vibrotactile actuators with a different and distinguishable haptic effect as indicated at 35. For example, as illustrated in FIG. 8, the actuator furthest from the individual's hand may be vibrated in a pulsed fashion or may be vibrated with a distinguishable vibratory profile. This signals the individual that the selected photograph is now uploaded to his or her personal storage device.

After the photograph is uploaded, the vibrotactile controller, monitoring the personal storage device, may activate one or more of the vibrotactile actuators so that the individual receives a continuous or intermittent haptic notification in his or her forearm vibrotactile display indicating that the file containing the photograph is present. When the individual arrives home, he or she may wish to download the photograph from his or her personal storage device to a personal home computer or other device incorporating a touch screen. If so, the individual may place his or her hand on the screen of the personal home computer and perform a finger or hand gesture that the computer is programmed to recognize as a request to download data from the personal storage device. The computer establishes communication with the wireless personal storage device and download begins. Simultaneously, the vibrotactile actuators of the forearm display are activated by the controller in a pattern that implies or feels like the data is moving back down the individual's arm. For example, the actuators may be activated in the reverse sequence as they were activated during upload of the data. When the download is complete, a distinguishable haptic effect is imparted, and the photograph appears on the touch screen beneath the individual's hand. The data embodying the photograph is now stored inside the personal computer and is out of the individual's personal storage device.

It will thus be seen that unique techniques and methodologies for selecting, uploading, and downloading data and information from and to computers coupled to touch screens is now disclosed. While the invention has been described within the context of preferred embodiments and methodologies, it will be understood that many other embodiments are possible, all within the scope of the invention. For example, the vibrotactile display need not be worn on the forearm of an individual but, instead, can be worn on a leg, around the torso, as a wristwatch, or at any other location on the body where haptic vibrotactile effects can be imparted. Further, the personal storage device need not be integrated into the vibrotactile display and directly coupled to the vibrotactile controller. It may, for example, be separately located and able to communicate wirelessly with the controller. The storage device may be a part of another device such as a cell phone, PDA, or music player. Further, while the vibrotactile actuators have been illustrated arrayed in a simple linear pattern, they might also be arranged in virtually any useful pattern for imparting vibrotactile haptic effects to an individual. There also may be only one vibrotactile actuator, on which multiple haptic patterns are displayed in order to represent interface operations. Finally, it should be clear that the invention is not limited to the upload and download of photographs as in the preferred embodiments. Indeed, the present application is applicable to any electronic data or information that an individual might want to upload to a personal memory device such as documents, music files, folders, spreadsheet data, emails, voice mails, and many others. In most of these alternative modes, the data will be represented on the screen by an appropriate icon rather than an image as in a photograph. Finally, while in the preferred embodiments, the vibrotactile sensations are imparted sequentially, the may just as well be imparted in other patterns over time. The word "spatiotemporal" may thus be used to refer to the broader class of patterns and sequences through which vibrotactile sensations can be applied. These and other additions, deletions, and modifications might be made to the preferred embodiments illustrated herein without departing from the spirit and scope of the invention as set forth in the claims.

What is claimed is:

1. A method of transferring digital information from a first electronic device to a second electronic device comprising:
   receiving a selection of information on the first electronic device to be transferred to the second electronic device;
   establishing communication between the first electronic device and the second electronic device;
   causing the selected information to be transferred from the first electronic device to the second electronic device, wherein the second electronic device stores the selected information based on the transfer;
   imparting a first vibrotactile sensation that indicates a beginning of the transfer of the selected information;
   imparting a second vibrotactile sensation that indicates a progress of the transfer of the selected information, wherein imparting the second vibrotactile sensation comprises
   imparting vibrotactile sensations sequentially in a predetermined spatial array via an array of vibrotactile actuators disposed in a band or sleeve worn on the individual's arm based on the progress of the transfer of the selected information;
   imparting a third vibrotactile sensation that indicates a completion of the transfer of the selected information; and
   imparting a continuous or intermittent vibrotactile sensation after the third vibrotactile sensation to indicate that the selected information is stored at the second electronic device.

2. The method of claim 1, wherein the information or an icon representing the information is displayed on a touch screen of the first electronic device.

3. The method of claim 2, wherein receiving the selection of information on the first electronic device further comprises receiving a touch on the touch screen in the vicinity of the displayed information or icon.

4. The method of claim 3, wherein receiving a touch on the touch screen further comprises receiving a hand gesture on the touch screen.

5. The method of claim 1, wherein establishing communication between the first electronic device and the second electronic device further comprises establishing wireless communication between the first electronic device and the second electronic device.

6. The method of claim 1, wherein the second electronic device comprises a personal storage device.

7. The method of claim 6, the method further comprising:
   wirelessly receiving the selected information and storing, at the personal storage device, the selected information.

8. The method of claim 1, wherein causing the selected information to be transferred from the first electronic device to the second electronic device further comprises causing the selected information to be wirelessly transmitted to the second electronic device.

9. The method of claim 1, wherein the spatial array comprises a line.

10. A method of providing an indication of a transfer of information between a first electronic device and a second electronic device, the method comprising:
- imparting a first vibrotactile sensation that indicates a beginning of the transfer of information between the first electronic device and the second electronic device;
- imparting a second vibrotactile sensation that indicates a progress of the transfer of information between the first electronic device and the second electronic device, wherein imparting the second vibrotactile sensation comprises
  - imparting vibrotactile sensations sequentially in a predetermined spatial array via an array of vibrotactile actuators disposed in a band or sleeve worn on the individual's arm based on the progress of the transfer of the information;
- imparting a third vibrotactile sensation that indicates a completion of the transfer of information; and
- imparting a continuous or intermittent vibrotactile sensation after the third vibrotactile sensation to indicate that the information is stored at the second electronic device.

11. The method of claim 10, wherein the first electronic device comprises a computer and the second electronic device comprises a personal storage device.

12. The method of claim 11, wherein the computer includes a touch screen display and wherein the information to be transferred is selected based on the touch screen display being engaged by a user in a predetermined manner.

13. A vibrotactile display device comprising:
- a plurality of vibrotactile actuators arranged in a predetermined array on a wearable item with a first vibrotactile actuator, a second vibrotactile actuator, and a third vibrotactile actuator being arranged in a line, the wearable item configured to be worn by an individual on a predetermined portion of the body; and
- an actuator controller coupled to the plurality of vibrotactile actuators, the controller being configured to:
  - actuate the first vibrotactile actuator to impart a first vibrotactile sensation to the predetermined portion of the body that indicates a beginning of a transfer of information between a first electronic device and a second electronic device;
  - actuate the first vibrotactile actuator, the second vibrotactile actuator and the third vibrotactile actuator sequentially along the line to sequentially impart the first vibrotactile sensation, a second vibrotactile sensation, and a third vibrotactile sensation, respectively, to the predetermined portion of the body that indicates a progress of the transfer of information between the first electronic device and the second electronic device;
  - actuate the third vibrotactile actuator to impart the third vibrotactile sensation to the predetermined portion of the body that indicates a completion of the transfer of information between the first electronic device and the second electronic device; and
  - actuate the first vibrotactile actuator, the second vibrotactile actuator, and/or the third vibrotactile actuator to impart a continuous or intermittent vibrotactile sensation to the predetermined portion of the body after the third vibrotactile sensation to indicate that the selected information is stored at the second electronic device.

14. The vibrotactile display device of claim 13, wherein the wearable item is an armband.

15. The vibrotactile display device of claim 13, wherein the first vibrotactile actuator, the second vibrotactile actuator, and the third vibrotactile actuator are actuated sequentially along the line in a first direction to indicate progress of an upload of information between the first electronic device to the second electronic device.

16. The vibrotactile display device of claim 15, wherein the first vibrotactile actuator, the second vibrotactile actuator, and the third vibrotactile actuator are actuated sequentially along the line in a second direction opposite the first direction to indicate progress of a download of information between the second electronic device to the first electronic device.

17. The vibrotactile display device of claim 13, wherein the first vibrotactile sensation imparted by the first vibrotactile actuator is a different vibrotactile haptic effect from the second vibrotactile sensation imparted by the second vibrotactile actuator.

18. The vibrotactile display device of claim 14, wherein the armband is coupled to a memory device configured to store transferred information.

19. The method of claim 1, wherein the first electronic device is a cell phone and the second electronic device is a wristwatch.

20. The method of claim 10, wherein the first electronic device is a cell phone and the second electronic device is a wristwatch.

21. The vibrotactile display device of claim 13, wherein the wearable item is a wristwatch.

* * * * *